United States Patent [19]

Ryu et al.

[11] Patent Number: 4,888,817
[45] Date of Patent: Dec. 19, 1989

[54] POLARIZATION DIVERSITY LIGHT RECEIVING SYSTEM USING BASEBAND COMBINING

[75] Inventors: Shiro Ryu, Ichikawa; Kiyofumi Mochizuki, Hachioji, both of Japan

[73] Assignee: Kokusai Denshin Denwa Kabushiki Kaisha, Tokyo, Japan

[21] Appl. No.: 258,817

[22] Filed: Oct. 17, 1988

[30] Foreign Application Priority Data

Oct. 28, 1987 [JP] Japan .................................. 62-270367

[51] Int. Cl.⁴ .............................................. H04B 9/00
[52] U.S. Cl. .................................... 455/619; 455/612; 455/615
[58] Field of Search ............... 455/600, 606, 607, 608, 455/612, 615, 616, 617, 619

[56] References Cited

U.S. PATENT DOCUMENTS 4,718,120  1/1988  Tzeng .................................. 455/619
4,723,315  2/1988  Whetherell ......................... 455/619

FOREIGN PATENT DOCUMENTS 0250819  1/1988  European Pat. Off. ............ 455/616
0172842  9/1985  Japan ................................... 455/619
8607658  12/1986  World Int. Prop. O. .......... 455/616

OTHER PUBLICATIONS

Kazovsky et al., "Sensitivity Penalty in Multichannel Coherent Optical Communications", Journal of Lightwave Technology, vol. 6, #9,9–88, pp. 1353–1365.

Primary Examiner—Robert L. Griffin
Assistant Examiner—Leslie Van Beek
Attorney, Agent, or Firm—Emmanuel J. Lobato; Robert E. Burns

[57] ABSTRACT

A polarization diversity light receiving system using base combining is disclosed, which is arranged so that the control signal for the local oscillator laser is the sum of squared values of received signals.

3 Claims, 5 Drawing Sheets

POLARIZATION DIVERSITY LIGHT RECEIVING SYSTEM USING BASEBAND COMBINING

BACKGROUND OF THE INVENTION

The present invention relates to a polarization diversity light receiving system and, more particularly, to a polarization diversity light receiving system utilizing baseband combining which stabilizes intermediate frequencies.

In heterodyne/coherent fiber optic communication it is necessary that the planes of polarization of signal light and local oscillator light be brought into agreement with each other on a photodetector of the receiver. However, the sensitivity for receiving light varies with time because the state of polarization of the signal light undergoes variations owing to various disturbances in the optical fiber transmission line. To avoid this, the polarization diversity light receiving system is employed as one of means for implementing stable light receiving sensitivity independent of variations in the state of polarization of the signal light.

With this system, the signal light having experienced variations in its state of polarization is split into two orthogonally polarized waves at the receiving end and the two polarized waves are each detected by local oscillator light having adjusted its plane of polarization to that of the polarized wave. By electrically combining together the two received signals it is possible to suppress the influence of variations in the state of polarization.

The polarization diversity light receiving system is divided into two types in terms of the above-mentioned electrical combining method. The first is a system which electrically combines two received signals together under an intermediate-frequency condition (which system will hereinafter be referred to as "intermediate frequency combining").

The second system is one that combines the two received signals after demodulating them independently of each other (which system will hereinafter be referred to as "baseband combining").

With the intermediate frequency combining, since a phase difference between the two orthogonally polarized wave components caused by variations in the state of polarization of an signal light varies every moment, the automatic phase adjustment adder is needed for adjusting the phases of the two received signals at all times; so that this inevitably involves a complex arrangement. In contrast thereto, the baseband combining combines the received signals after demodulating them, and hence has the advantage of dispensing with the above-mentioned phase adjustment; and some practical embodiments have been proposed so far. On the other hand, the semiconductor laser for emitting the signal light or local oscillator light is defective in that the oscillation wavelength is liable to vary under the influences of external temperature changes and aging. When the oscillation wavelength (i.e. frequency) of the signal light or local oscillation light varies, no stable detection can be achieved. To solve this problem, it has already been proposed, as an intermediate frequency stabilizing method in the coherent type light receiving system, to feed back to the local oscillation laser an electrical signal obtained by discriminating the intermediate frequency (T. Okoshi, "Feasibility Study of Frequency-Division Multiplexing Optical Communication Systems Using Optical Heterodyne or Homodyne Schemes", Institute of Electronics and Communication Engineers of Japan, Paper of Technical Group, OQE78-139, 1979).

However, since the conventional polarization diversity light receiving system using intermediate frequency combining has an automatic phase adjustment adder, frequency stability is affected by fluctuations in the state of polarization of the signal light. Accordingly, there is a strong demand for an intermediate frequency stabilizing system useful for the polarization diversity light receiving system employing the baseband combining which does not involve the automatic phase adjustment adder, but no proposals have been made up to now.

SUMMARY OF THE INVENTION

An object of the present invention, intended to solve the aforementioned problems of the prior art, is to provide a polarization diversity light receiving system employing the baseband combining which provides for increased sensitivity to received light regardless of the polarization characteristic of signal light.

The feature of the present invention resides in that the polarization diversity light receiving system using the base-band combining is arranged so that the control signal for the local oscillator laser is the sum of squared values of received signals.

BRIEF DESCRIPTION OF THE DRAWINGS

The present invention will be described in detail below in comparison with prior art with reference to accompanying drawings, in which.

DETAILED DESCRIPTION

To make differences between prior art and the present invention clear, examples of prior will first be described.

Figure 1:
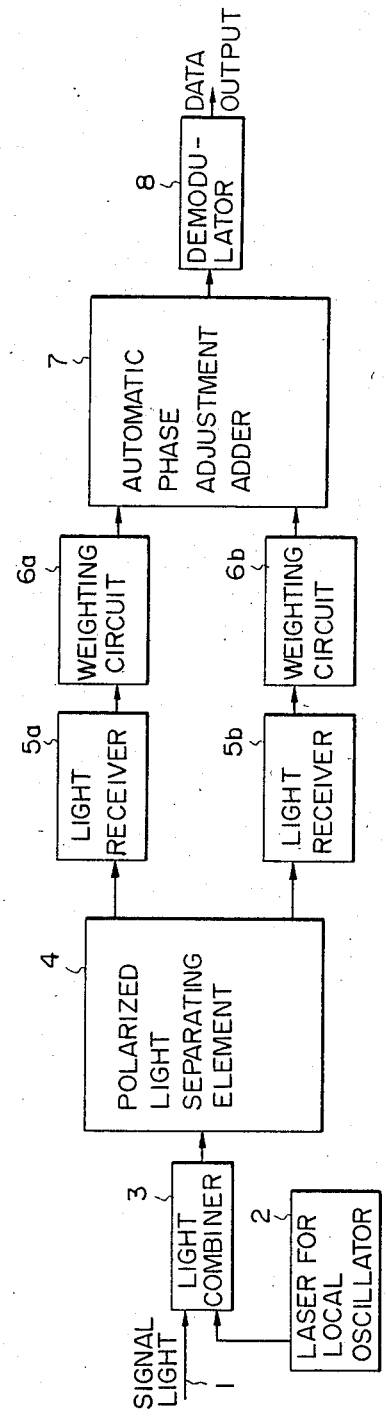
FIG. 1 is a block diagram showing an example of the arrangement of a conventional polarization diversity light receiving system which combines two received signals by the intermediate frequency combining.

FIG. 1 is a block diagram of the polarization diversity light receiving system using the conventional intermediate frequency combining. Reference numeral 1 indicates signal light having propagated over an optical fiber transmission line; 2 a laser for local oscillation; 3 a light combiner for combining the signal light with local oscillator light; 4 a polarized light separating element for separating combined signal light and local oscillator light into two orthogonally polarized components; 5a and 5b light receivers, each converting to an electrical signal a beat component of the light into which signal light and local oscillation light have been orthogonally combined; 6a and 6b weighting circuits for weighting the respective received signals, as required, for an optimum combination thereof; 7 an automatic phase adjustment adder for adding together the two weighted received signals while adjusting their phases relative to each other; and 8 a demodulator for demodulating the modulated received signal.

Figure 2:
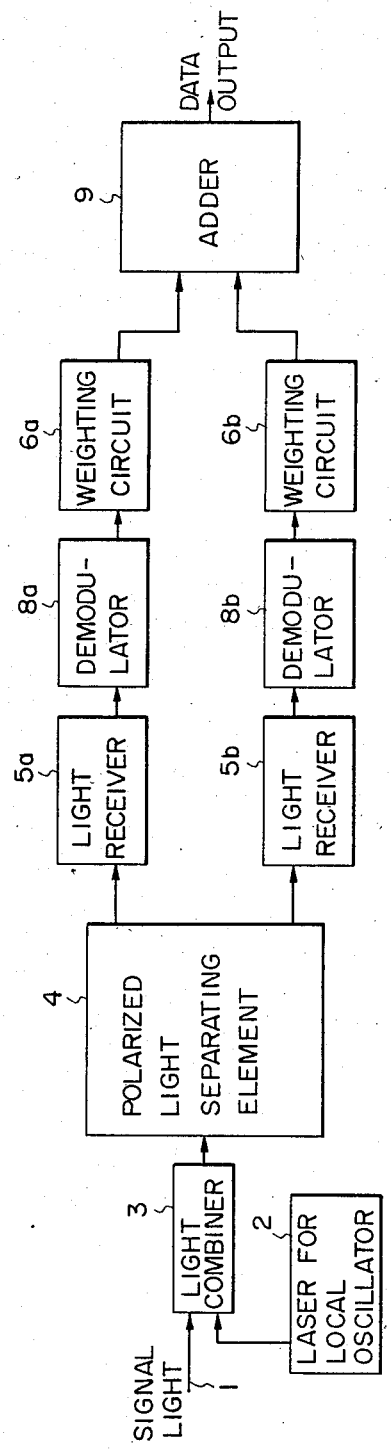
FIG. 2 is a block diagram showing an example of the arrangement of a conventional polarization diversity light receiving system which combines two received signals by the baseband combining.

The second system is one that combines the two received signals after demodulating them independently of each other (which system will hereinafter be referred to as "baseband combining"). FIG. 2 is a block diagram of the polarization diversity light receiving system employing the conventional baseband combining. In FIG. 2 parts having the same functions as those in FIG. 1 are identified by the same reference numerals and no description will be repeated in connection with them. The feature of the polarization diversity light receiving system utilizing the baseband combining resides in that the received signals split into orthogonally polarized waves and then converted into electrical signals are demodulated by demodulators 8a and 8b, respectively, and the demodulated signals are added together by an adder 9 after being weighted.

Accordingly, the baseband combining differs from the intermediate frequency combining in an arrangement in which the electrical signals converted by the light receivers 5a and 5b are demodulated by the demodulators 8a and 8b and then weighted, respectively, thereafter being added together.

Figure 3:
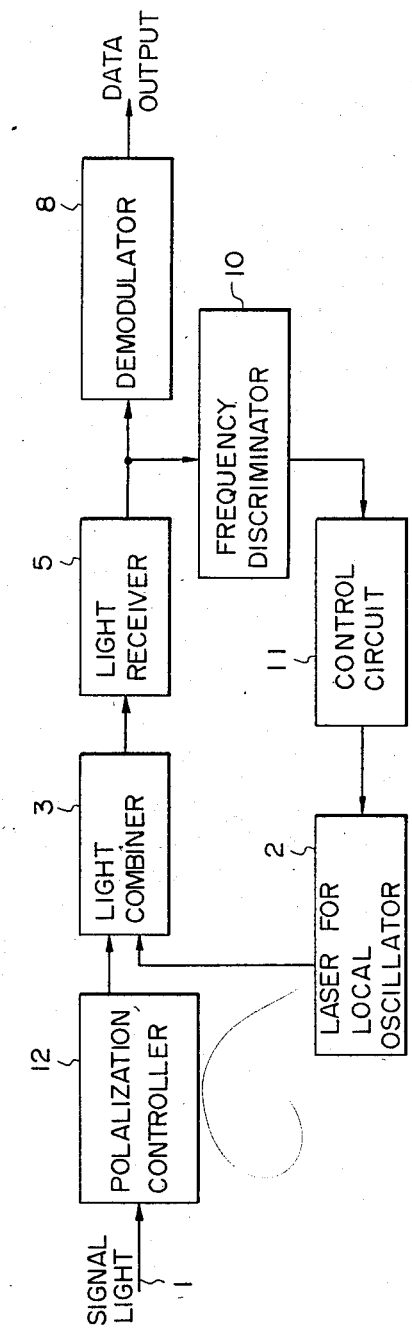
FIG. 3 is a block diagram showing the outline of a conventional coherent type light receiving system.

FIG. 3 is a schematic diagram of a coherent type light receiving system employing the conventional intermediate frequency stabilizing. Reference numeral 12 indicates a polarization controller by which the planes of polarization of the signal light 1 and the local oscillator light emitted from the local oscillator laser 2 are brought into agreement with each other, 10 a frequency discriminator for generating an output voltage corresponding to a frequency fluctuation, and 11 a control circuit for controlling the oscillation wavelength (i.e. frequency) of the local oscillator laser 2 in accordance with the output voltage of the frequency discriminator 10. In FIG. 3 the received signal converted into an electrical signal is fedback to the laser via the frequency discriminator 10 so as to make the frequency of the local oscillator light follow the frequency of the signal light 1 having undergone a frequency fluctuation. Incidentally, the frequency discriminator 10 generates an output voltage which is provided corresponding to a frequency fluctuation. The frequency of the local oscillator laser is controlled by the control circuit 11 through uitlization of fluctuations in the output voltage thus obtained, thereby obtaining local oscillator light of a frequency following that of the signal light.

However, even if the intermediate frequency stabilizing for the conventional receiving system, shown in FIG. 3, is applied to the polarization diversity light receiving system, the local oscillator laser is controlled by use of the output from one of the light receivers 5a and 5b in FIG. 2, so that the output of the frequency of the frequency discriminator 10 varies by fluctuations in the state of polarization of the signal light, leading to a failure in obtaining high light receiving sensitivity. In particular, there is a strong demand for an intermediate frequency stabilizing system useful for the polarization diversity light receiving system employing the baseband combining which does not involve the automatic phase adjustment adder 7, but no proposals have been made up to now.

With reference to the accompanying drawings the present invention will hereinafter be described in detail.

In the following description the parts corresponding to those used in the prior art examples will be indicated by the same reference numerals and will not be described in detail for the sake of brevity.

(Embodiment 1)

Figure 4:
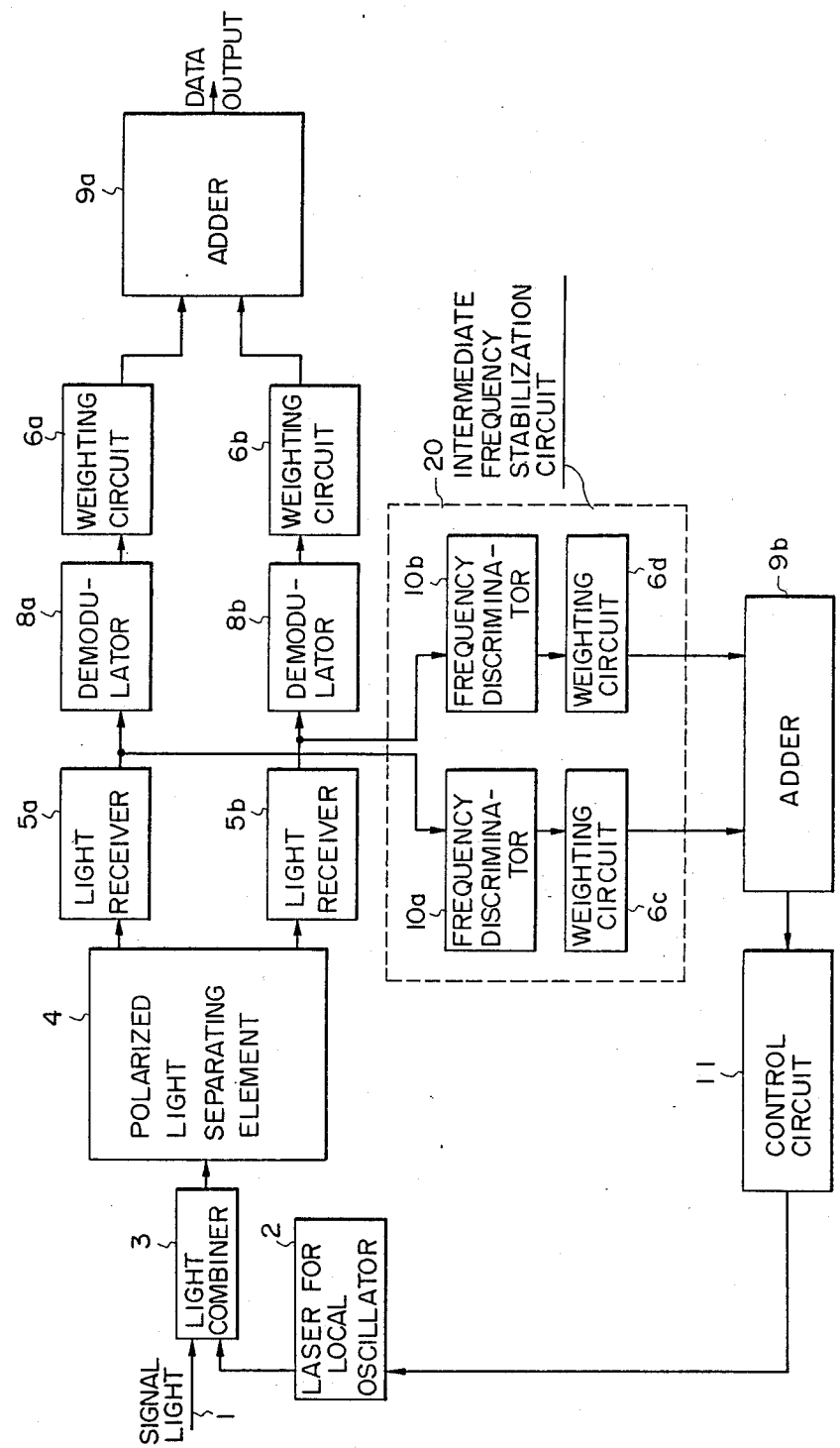
FIG. 4 is a block diagram illustrating, as a first embodiment of the present invention, a polarization diversity light receiving system which employs the baseband combining.

FIG. 4 is a block diagram of the polarization diversity light receiving system employing the baseband combining according to the present invention. Reference numerals 10a and 10b indicate frequency discriminators for discriminating the frequencies of intermediate-frequency signals output from the light receivers 5a and 5b, 6c and 6d weighting circuits for weighting the frequency-discriminated signals as required, 9b an adder for adding together the outputs of the weighting circuits 6c and 6d, 11 a control circuit for generating a frequency stabilizing signal, and 20 an intermediate frequency stabilizing circuit made up of the frequency discriminators 10a and 10b and the weighting circuits 6c and 6d.

In general, the intensity of a detected signal obtained by optical heterodyne or homodyne detection is in proportion to $\sqrt{P_S P_L}$, where $P_S$ is the power of signal light and $P_L$ is the power of local oscillator light. Accordingly, letting the branching ratio of the signal light by the polarized light separating element 4 be represented by $\alpha/(1-\alpha)$ where $(0 \leq \alpha \leq 1)$, the outputs of the light receivers are in proportion to $\sqrt{\alpha P_S P_S}$ and $\sqrt{(1-\alpha)P_S P_L}$, respectively. The value $\alpha$ varies in the range of from 0 to 1 every moment in response to variations in the state of polarization of the signal light. Since the outputs of the frequency discriminators 10a and 10b are usually dependent on the input voltage, it is impossible to stabilize the intermediate frequency regardless of the state of polarization by use of the output voltage from one of the light receivers.

In view of the above, the present invention is based on the fact that the sum of squared values of the proportional coefficients $\sqrt{\alpha P_S P_L}$ and $\sqrt{(1-\alpha)P_S P_L}$ of the output voltages from the light receivers 5a and 5b is not dependent on variations in the state of polarization. That is, the intermediate frequency stabilization circuit 20 is formed by connecting proper weighting circuits 6c and 6d to the outputs of the frequency discriminators 10a and 10b and is so arranged as to provide outputs each corresponding to the square of the output voltage of one of the light receivers 5a and 5b, and these outputs are added together by the adder 9b to obtain the sum of the squared values. Accordingly, the received signal, which is the sum of the squared values, is dependent on the frequency of the signal light but is not dependent on the state of its polarization, and this signal is applied to the control circuit 11, the output of which is applied as a control signal to the local oscillator laser 2 to control its frequency. In case of employing a square-law detector as the intermediate frequency stabilization circuit 20, the output voltage of the light receivers 5a and 5b can be obtained as squared values equivalently, even if the weighting circuits 6c and 6d are omitted.

As described above, the present invention permits stabilization of the intermediate frequency regardless of the state of polarization of the signal light 1, making it possible to receive the signal light with a high degree of sensitivity.

(Embodiment 2)

Figure 5:
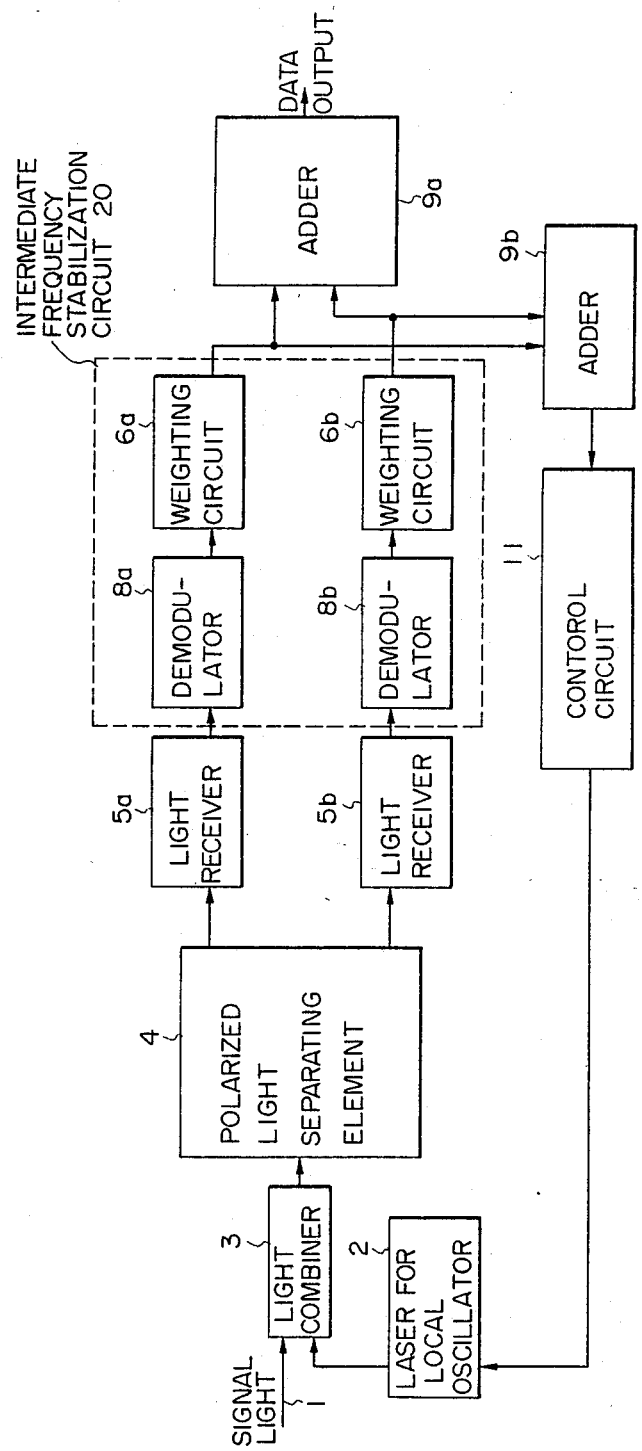
FIG. 5 is a block diagram illustrating, as a second embodiment of the present invention, a polarization diversity light receiving system employing the baseband combining and applied to FSK modulation.

FIG. 5 illustrates a second embodiment of the present invention. This embodiment is effective only for an FSK modulation system in which the signal light 1 is subjected to frequency shift keying. The demodulators 8a and 8b for demodulating FSK-modulated signals are similar in operation to the afore-mentioned frequency discriminators. In addition, for the same reason given above in connection with Embodiment 1, the outputs of the demodulators 8a and 8b are given, by the weighting circuits 6a and 6b, weights equivalently corresponding to their squares before being added together by the adder 9a; so that it is possible to obtain a control signal for the local oscillator laser 2 independently of the state of polarization of the signal light by partly branching the weighted outputs and adding together them by the adder 9b. In other words, the intermediate frequency stabilization circuit 20 is equivalently constituted by the demodulators 8a and 8b and the weighting circuits 6a and 6b.

Incidentally, it was found experimentally that the constitution of the present invention provides a stability of $\pm 2$ MHz regardless of the state of polarization of the signal light.

As described above, the present invention stabilizes the intermediate frequency independently of the polarization characteristic of the signal light, and hence allows a substantial improvement of the sensitivity for receiving signal light.

As described above, according to the present invention, the stabilization of the intermediate frequency in the polarization diversity light receiving system can be performed independently of the state of polarization of signal light by an arrangement in which the control signal for the local oscillator laser 2 is provided equivalently in the form of the sum of squared values of the received signal. This improves the stability of the system and the sensitivity for receiving the signal light and permits frequency multiplexing. Accordingly, the present invention is of great utility when employed in practice.

What we claim is:

1. A polarization diversity light receiving system using baseband combining in which signal light of an arbitrary plane of polarization as a result of its propagation over an optical fiber, is split into orthogonal polarized wave components and detected by use of oscillation light output from a local oscillator laser, the polarized wave components are detected to obtain electrical signals which are then combined, characterized by:

intermediate frequency stabilizing means for discriminating the frequency of each of the electrical signals, and for generating an output voltage corresponding to a variation in the frequency, and for weighing the output voltage to develop a square value of each electrical signal; and adding means for combining voltage outputs of the intermediate frequency stabilizing means;

means connected to the adding means for developing a control signal, which is the sum of the squared values of the electrical signals obtained by the adding means, applied to control the local oscillator laser, thereby stabilizing its frequency.

2. A polarization diversity light receiving system using baseband combining according to claim 1, in which said intermediate frequency stabilizing means comprises demodulators provided to receive the electrical signals at inputs of said demodulators for demodulation of the electrical signals.

3. A polarization diversity light receiving system using baseband combining according to claim 1, in which said intermediate frequency stabilizing means comprises for the signal light of FSK modulation in common use demodulators of the electrical signals and weighting circuite receiving outputs of the demodulators.

* * * * *